United States Patent
Hung et al.

(10) Patent No.: US 9,075,590 B2
(45) Date of Patent: Jul. 7, 2015

(54) VOLTAGE IDENTIFICATION DEFINITION REFERENCE VOLTAGE GENERATION CIRCUIT AND BOOT VOLTAGE GENERATING METHOD THEREOF

(71) Applicant: uPI Semiconductor Corp., Hsinchu County (TW)

(72) Inventors: Shan-Fong Hung, Hsinchu County (TW); Sheng-Hsuan Wang, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 96 days.

(21) Appl. No.: 13/778,151

(22) Filed: Feb. 27, 2013

(65) Prior Publication Data

US 2014/0129851 A1 May 8, 2014

(30) Foreign Application Priority Data

Nov. 6, 2012 (TW) .............................. 101141203 A

(51) Int. Cl.
G05F 3/16 (2006.01)
G06F 1/26 (2006.01)

(52) U.S. Cl.
CPC ........................................ G06F 1/26 (2013.01)

(58) Field of Classification Search
CPC ............... G06F 1/26; G05F 3/30; G05F 3/26; H03M 11/04
USPC .............. 323/222–225, 233–235, 271–275, 323/282–285, 313
See application file for complete search history.

(56) References Cited

U.S. PATENT DOCUMENTS

| | | | | | |
|---|---|---|---|---|---|
| 4,710,970 | A | * | 12/1987 | Wu et al. | 455/113 |
| 4,961,057 | A | * | 10/1990 | Ibukuro | 330/295 |
| RE33,941 | E | * | 5/1992 | Lorincz et al. | 361/87 |
| 5,138,192 | A | * | 8/1992 | Hsu | 327/50 |
| 5,452,700 | A | * | 9/1995 | Matsuura | 123/490 |
| 5,515,830 | A | * | 5/1996 | Arakowa | 123/490 |
| 5,691,605 | A | * | 11/1997 | Xia et al. | 315/307 |
| 5,941,216 | A | * | 8/1999 | Arakawa | 123/490 |
| 6,016,260 | A | * | 1/2000 | Heeringa | 363/21.18 |
| 6,184,669 | B1 | * | 2/2001 | Matsuo | 323/303 |
| 6,483,684 | B2 | * | 11/2002 | Isobe | 361/93.9 |
| 6,657,475 | B1 | * | 12/2003 | Zahn | 327/309 |
| 7,358,710 | B2 | * | 4/2008 | Luo et al. | 323/282 |
| 7,715,216 | B2 | * | 5/2010 | Liu et al. | 363/89 |
| RE43,946 | E | * | 1/2013 | Sase et al. | 323/283 |
| 8,890,494 | B2 | * | 11/2014 | Gasperi | 323/266 |
| 2004/0150928 | A1 | * | 8/2004 | Goodfellow et al. | 361/90 |
| 2009/0195304 | A1 | * | 8/2009 | Bankman et al. | 327/552 |
| 2009/0213629 | A1 | * | 8/2009 | Liu et al. | 363/89 |
| 2010/0001702 | A1 | * | 1/2010 | Tateishi | 323/282 |
| 2012/0134516 | A1 | * | 5/2012 | Prentice et al. | 381/123 |
| 2012/0326631 | A1 | * | 12/2012 | Naruo et al. | 315/297 |

* cited by examiner

Primary Examiner — Timothy J Dole
Assistant Examiner — Yusef Ahmed
(74) Attorney, Agent, or Firm — Jianq Chyun IP Office

(57) ABSTRACT

A voltage identification definition (VID) reference voltage generation circuit and a boot voltage generating method thereof are provided. In the boot voltage generating method, a VID reference voltage generation circuit is provided. The VID reference voltage generation circuit includes a preset voltage providing unit, a switch and a VID input signal detection unit. When the VID input signal detection unit detects no input of a VID signal, a control signal is generated to control the switch, such that the preset voltage providing unit provides an adjustable preset voltage.

11 Claims, 5 Drawing Sheets

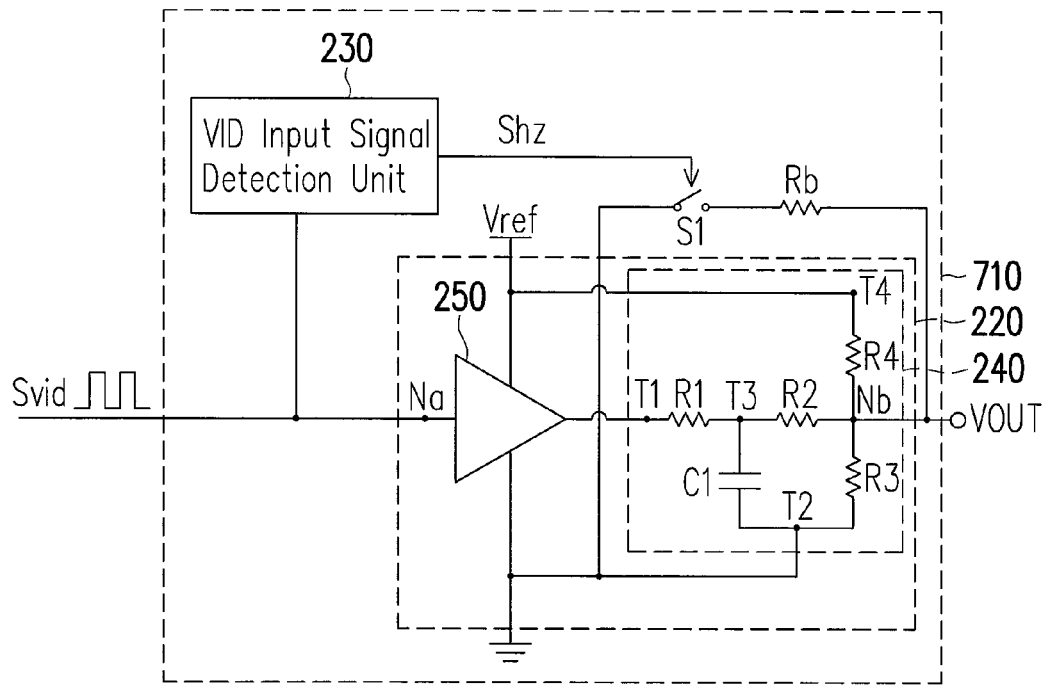

FIG. 7

```
┌─────────────────────────────┐
│ Providing a VID reference voltage generation │
│ circuit, wherein the VID reference voltage   │
│ generation circuit comprises a preset        │─ S801
│ voltage providing unit, a switch and a VID   │
│ input signal detection unit                  │
└─────────────────────────────┘
              ↓
┌─────────────────────────────┐
│ Generating a control signal to control the   │
│ switch, when the VID input signal detection  │
│ unit detects no input of a VID signal, such  │─ S803
│ that the preset voltage providing unit       │
│ provides an adjustable preset voltage        │
└─────────────────────────────┘
```

FIG. 8

VOLTAGE IDENTIFICATION DEFINITION REFERENCE VOLTAGE GENERATION CIRCUIT AND BOOT VOLTAGE GENERATING METHOD THEREOF

CROSS-REFERENCE TO RELATED APPLICATION

This application claims the priority benefit of Taiwan application serial no. 101141203, filed on Nov. 6, 2012. The entirety of the above-mentioned patent application is hereby incorporated by reference herein and made a part of this specification.

BACKGROUND OF THE INVENTION

1. Field of the Invention

The present invention relates to a boot voltage technology, and more particularly, to a voltage identification definition (VID) reference voltage generation circuit and a boot voltage generating method.

2. Description of Related Art

FIG. 1 is a block diagram of a conventional pulse width modulation voltage identification definition (PWMVID) reference voltage generator. Typically, a computer system 100 includes a PWMVID reference voltage generator 10. The PWMVID reference voltage generator 10 includes a resistor-capacitor network 20. The resistor-capacitor network 20 consists of resistors R1 to R4 and capacitor C1.

When the computer system 100 normally operates, a central processing unit (CPU) 30 generates a VID signal Svid with a duty cycle. The duty cycle D of this PWMVID signal Svid is equal to P2/P1, where P1 is a time duration of a cycle and P2 is a time duration of logic high level. After receiving the VID signal Svid, the PWMVID reference voltage generator 10 generates an output voltage Vout through the resistor-capacitor network 20. During normal operation, the output voltage Vout can be adjusted according to the VID signal Svid. The convenience of this technique includes that a slew rate of the VID signal Svid can be adjusted and the value of the output voltage Vout can also be adjusted. To a user, therefore, this technique has great freedom to adjust.

However, when the computer system 100 boots up, the central processing unit 30 has not transmitted the VID signal Svid to the PWMVID reference voltage generator 10 and, therefore, the output voltage Vout is a fixed value which cannot be adjusted. In other words, the output voltage Vout when the computer system 100 just boots up is determined by the reference voltage Vref and the resistors R3, R4.

Since the output voltage Vout when the computer system just boots up is fixed, the user is not able to decide the voltage value. The output voltage Vout when the computer system just boots up can also be referred to as a boot voltage. In some cases, the boot voltage needs to be a particular voltage value to execute a particular procedure. A particular procedure may not be executed immediately because the boot voltage is not equal to the particular voltage value.

SUMMARY OF THE INVENTION

Accordingly, the present invention is directed to a VID reference voltage generation circuit and a boot voltage generating method thereof for addressing the above described problem.

The present invention provides a voltage identification definition (VID) reference voltage generation circuit including a preset voltage providing unit, a switch and a VID input signal detection unit. The switch is coupled to the preset voltage providing unit. The VID input signal detection unit is coupled to an input terminal of the preset voltage providing unit. When detecting no input of a VID signal, the VID input signal detection unit generates a control signal to control the switch such that the preset voltage providing unit provides an adjustable preset voltage.

Viewed from another view point, the present invention provides a boot voltage generating method. In this method, a VID reference voltage generation circuit is provided. The VID reference voltage generation circuit includes a preset voltage providing unit, a switch and a VID input signal detection unit. When the VID input signal detection unit detects no input of a VID signal, a control signal is generated to control the switch, such that the preset voltage providing unit provides an adjustable preset voltage.

In one embodiment, the preset voltage providing unit includes a resistor-capacitor network, and the resistor-capacitor network receives a reference voltage.

In one embodiment, when the switch is turned on, it changes a voltage of a voltage division node of the resistor-capacitor network, and the voltage division node provides the adjustable preset voltage.

In one embodiment, the switch is coupled to a terminal of the resistor-capacitor network.

In one embodiment, the switch is coupled to a terminal, an internal node or a voltage division node of the resistor-capacitor network through a resistor, the voltage division node provides the adjustable preset voltage.

In one embodiment, the VID signal may be of a series VID signal type, a parallel VID signal type or a pulse modulation VID signal type.

In view of the foregoing, the VID reference voltage generation circuit and boot voltage generating method of the present invention can immediately provide the adjustable preset determined VOUT at the time, for example, when the computer system just boots up, without affecting the original VID characteristics. Therefore, the present VID reference voltage generation circuit and boot voltage generating method have greater freedom in its application.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2C is a view showing resistors at a voltage division node Nb at the time the computer system just boots up and the switch S1 has not been turned on.

FIG. 2D is a view showing resistors at the voltage division node Nb at the time the computer system just boots up and the switch S1 is turned on.

FIG. 3 to FIG. 7 are block diagrams of the VID reference voltage generation circuits according embodiments of the present invention.

FIG. 8 is a flow chart of a boot voltage generating method according to one embodiment of the present invention.

DESCRIPTION OF THE EMBODIMENTS

Reference will now be made in detail to the exemplary embodiments of the invention, examples of which are illustrated in the accompanying drawings. In addition, whenever possible, identical or similar reference numbers stand for identical or similar elements in the figures and the embodiments.

Figure 1:
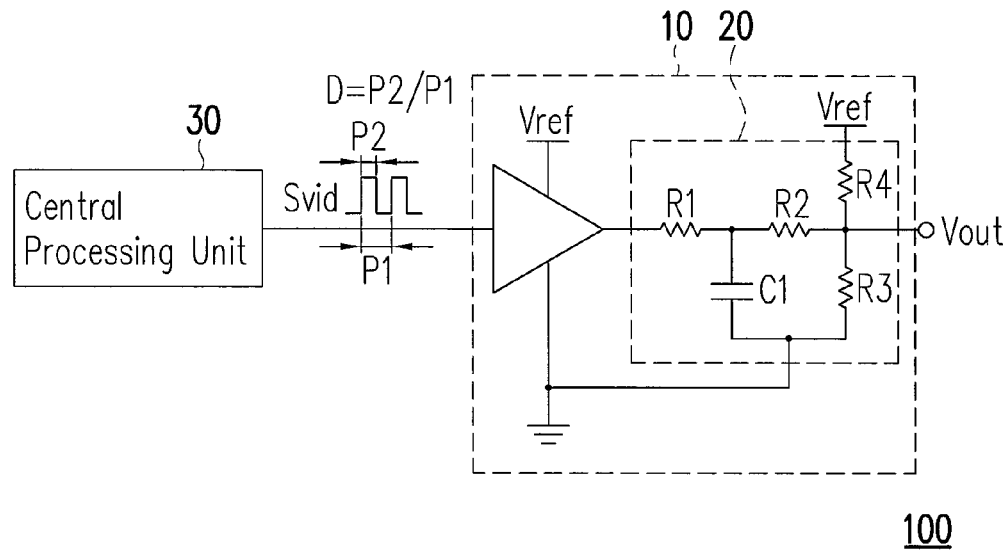
FIG. 1 is a block diagram of a conventional pulse width modulation voltage identification definition (PWMVID) reference voltage generator.
Figure 2A:
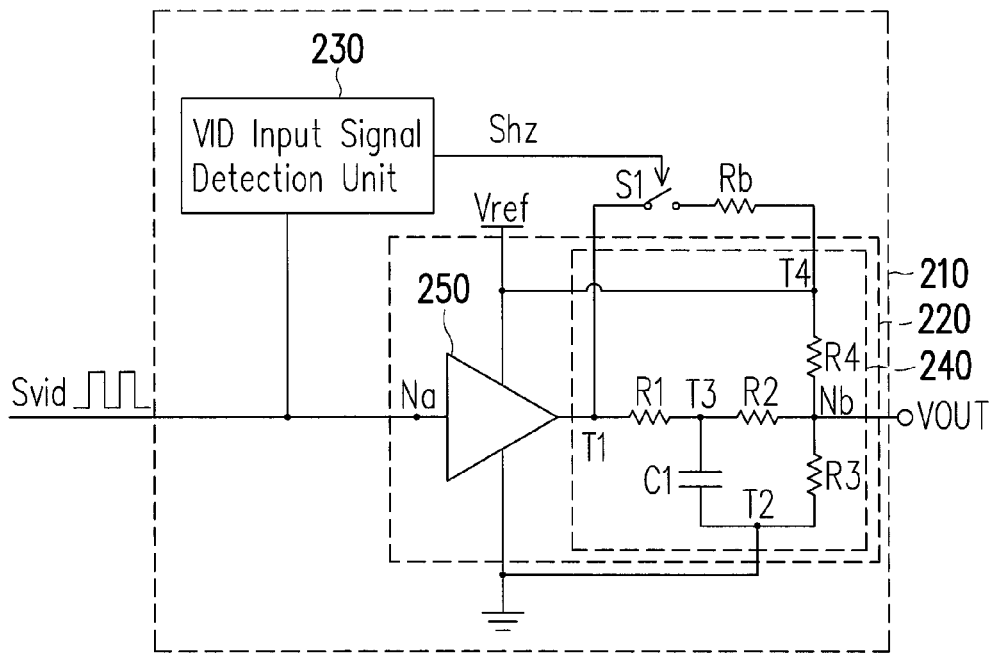
FIG. 2A is a block diagram of a VID reference voltage generation circuit according to one embodiment of the present invention.
Figure 2B:
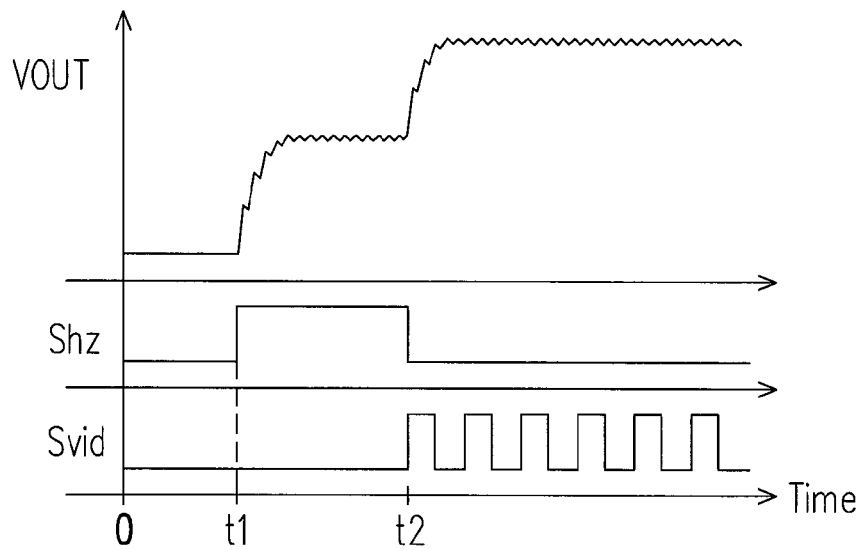
FIG. 2B illustrates a timing sequence of a VID reference voltage generation circuit according to one embodiment of the present invention.

FIG. 2A is a block diagram of a voltage identification definition (VID) reference voltage generation circuit according to one embodiment of the present invention. FIG. 2B illustrates a timing sequence of the VID reference voltage generation circuit of FIG. 2A. Referring to FIG. 2A and FIG. 2B, the VID reference voltage generation circuit 210 may be utilized in a computing system. The VID reference voltage generation circuit 210 includes a preset voltage providing unit 220, a switch S1 and a VID reference voltage input signal detection unit 230. The switch S1 is coupled to the preset voltage providing unit 220. The VID input signal detection unit 230 is coupled to an input terminal Na of the pre-set voltage providing unit 220.

The preset voltage providing unit 220 includes a resistor-capacitor network 240 and a buffer 250, and the resistor-capacitor network 240 receives a reference voltage Vref. The resistor-capacitor network 240 includes resistors R1 to R4 and a capacitor C1. It is noted that the resistor-capacitor network 240 of the present invention should not be limited in its configuration to any particulars described herein.

The switch S1 is coupled to a terminal of the resistor-capacitor network 240. In addition, the switch S1 may further be coupled to another terminal, an internal node or a voltage division node of the resistor-capacitor network through a resistor Rb. The voltage division node provides an adjustable preset voltage. In FIG. 2A, a first terminal of the switch S1 is coupled to a terminal T1. A second terminal of the switch S1 is coupled to a terminal T4 through the resistor Rb.

In a typical computer system, a VID signal Svid generated by a central processing unit varies according to its work mode so as to dynamically adjust its operation voltage (or core voltage) to save power consumption. The VID signal Svid may be of a series VID type, a parallel VID type or a pulse modulation VID type.

After a period of time (e.g. time 0 to t1) after the VID input signal detection unit 230 detects no input of the VID signal Svid (e.g. when the computer system just boots up or there is completely no VID signal Svid, and a detected result of the VID input signal detection unit 230 is a high impedance state), then at time t1, a logic high level control signal Shz may be generated to control the switch S1. After the switch S1 is turned on, the preset voltage providing unit 220 is enabled to provide an adjustable preset voltage VOUT.

In addition, at time t2, because the VID input signal detection unit 230 detects an input of the VID signal Svid, the control signal Shz generated turns from logic high level to a logic low level, such that the switch S1 is not turned on. After the time t2, the operation of the VID reference voltage generation circuit 210 is no longer affected by the switch S1. The preset voltage providing unit 220 restores to its original operation characteristic. For example, its output voltage is the adjustable preset voltage VOUT that can be adjusted according to the VID signal Svid.

Figure 2C:
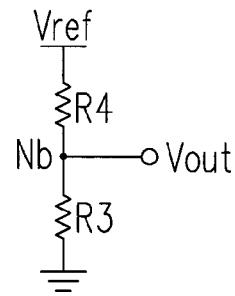
Figure 2D:
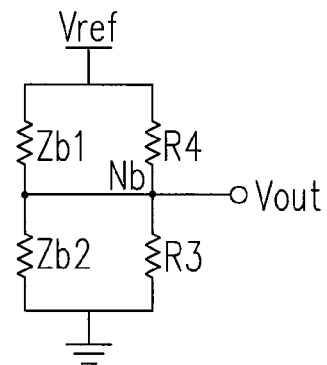

FIG. 2C is a view showing resistors at a voltage division node Nb at the time the computer system just boots up and the switch S1 has not been turned on. FIG. 2D is a view showing resistors at the voltage division node Nb at the time the computer system just boots up and the switch S1 is turned on.

In FIG. 2C, the adjustable preset voltage VOUT is related to the reference voltage Vref and the resistors R3 and R4. The adjustable preset voltage VOUT may be expressed by Equation 1 below.

$$VOUT_{S1\_OFF} = Vref \times \frac{R3}{R3 + R4} \quad \text{(Equation 1)}$$

Referring to FIG. 2A and FIG. 2D, in FIG. 2D, turn-on of the switch S1 changes the voltage of the voltage division node Nb of the resistor-capacitor network 220, and the voltage division node Nb provides the adjustable preset voltage VOUT. The resistors Rb, R1, R2 and capacitor C1 can form impedance Zb1 and Zb2. Therefore, the adjustable preset voltage VOUT is related to the reference voltage Vref, resistors R3, R4 and impedance Zb1, Zb2. The adjustable preset voltage VOUT may be expressed by Equation 2 below.

$$VOUT_{S1\_ON} = Vref \times \frac{Zb2||R3}{Zb2||R3 + Zb1||R4} \quad \text{(Equation 2)}$$

In general, $VOUT_{S1\_OFF}$ is 0.9V, $VOUT_{S1\_ON}$ can be adjusted to 0.5V to 1.5V.

In view of the above description, the VID reference voltage generation circuit 210 can immediately provide the adjustable preset determined VOUT at the time, for example, when the computer system just boots up, without affecting the original VID characteristics. Therefore, the present VID reference voltage generation circuit 210 has greater freedom in its application.

On the other hand, coupling of the switch S1 is not limited to the particular way shown in FIG. 2A. Rather, the switch S1 may be coupled in a variety of ways as exemplified below. FIG. 3 to FIG. 7 are block diagrams of the VID reference voltage generation circuits according embodiments of the present invention. The VID reference voltage generation circuits 310, 410, 510, 610 and 710 are based on the architecture of the VID reference voltage generation circuit 210 and are similar in their structure. As such, parts of the circuits 310, 410, 510, 610 and 710 that are the same as the circuit 210 is not repeated herein.

Figure 3:
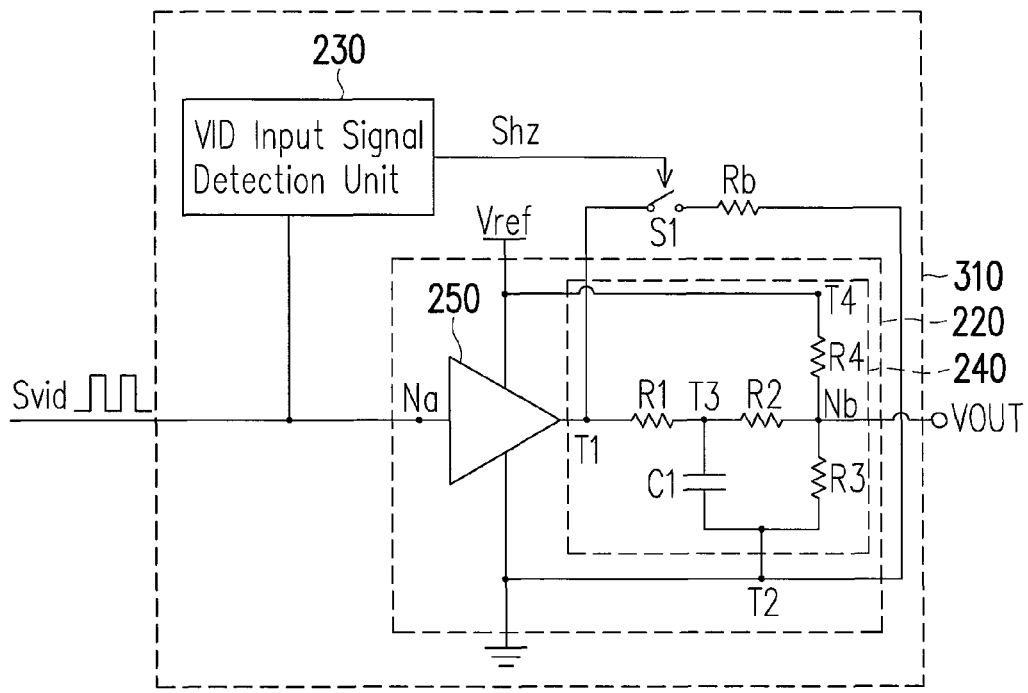

In FIG. 3, the first terminal of the switch S1 is coupled to the terminal T1 of the resistor-capacitor network 240. The second terminal of the switch S1 is coupled to the terminal T2 of the resistor-capacitor network 240 through the resistor Rb.

Figure 4:
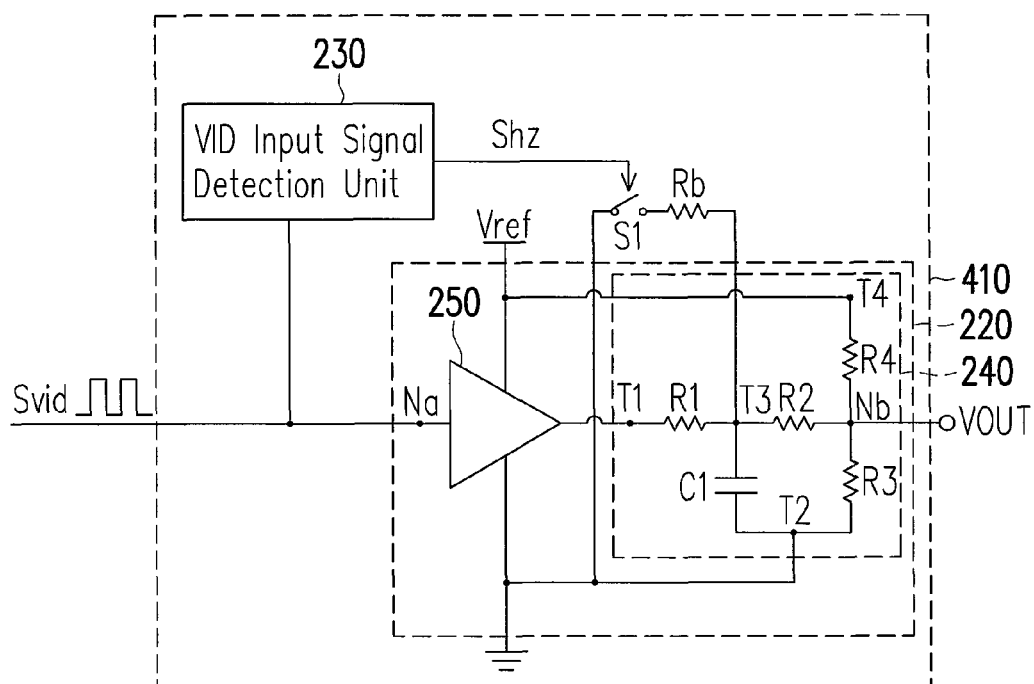

In FIG. 4, the first terminal of the switch S1 is coupled to the terminal T2 of the resistor-capacitor network 240. The second terminal of the switch S1 is coupled to the internal node T3 of the resistor-capacitor network 240 through the resistor Rb.

Figure 5:
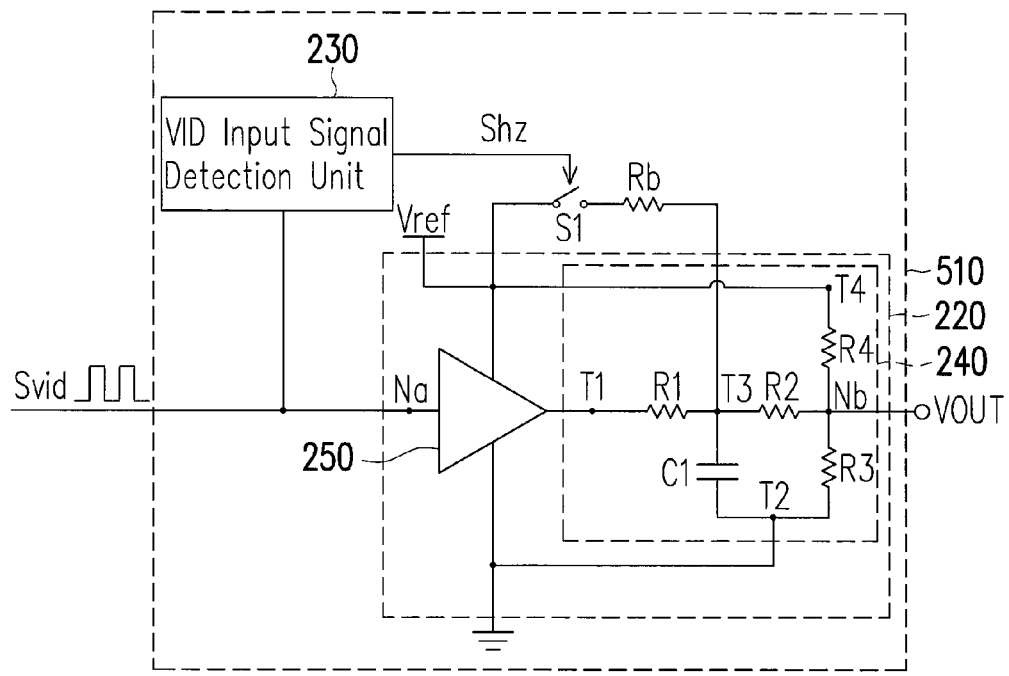

In FIG. 5, the first terminal of the switch S1 is coupled to the terminal T4 and reference voltage Vref of the resistor-capacitor network 240. The second terminal of the switch S1 is coupled to the internal node T3 of the resistor-capacitor network 240 through the resistor Rb.

Figure 6:
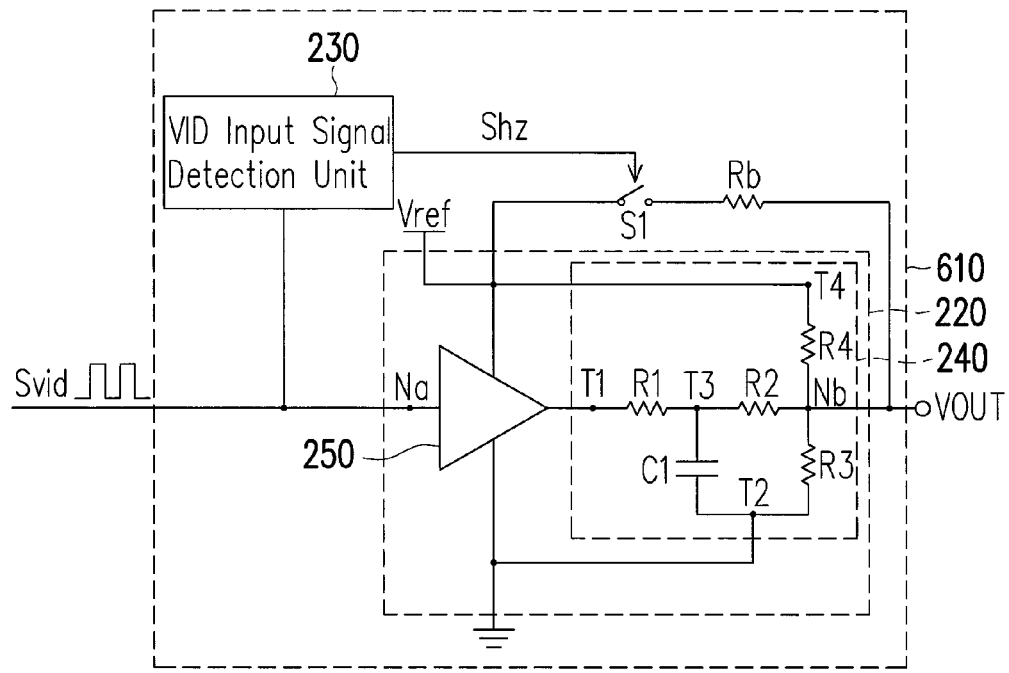

In FIG. 6, the first terminal of the switch S1 is coupled to the terminal T4 and reference voltage Vref of the resistor-capacitor network 240. The second terminal of the switch S1 is coupled to the voltage division node Nb of the resistor-capacitor network 240 through the resistor Rb. The voltage division node Nb provides the adjustable preset voltage VOUT.

In FIG. 7, the first terminal of the switch S1 is coupled to the terminal T2 of the resistor-capacitor network 240. The second terminal of the switch S1 is coupled to the voltage division node Nb of the resistor-capacitor network 240 through the resistor Rb.

Based on the descriptions disclosed in the aforementioned exemplary embodiments, a boot voltage generating method may be briefed below. More specifically, FIG. 8 is a flow chart of a boot voltage generating method according to one embodiment of the present invention. Referring to FIG. 2A and FIG. 8, the boot voltage generating method of the present embodiment can include the following steps:

providing the VID reference voltage generation circuit 210, wherein the VID reference voltage generation circuit 210 comprises the preset voltage providing unit 220, the switch S1 and the VID input signal detection unit 230 (step S810), and generating the control signal Shz to control the switch S1, when the VID input signal detection unit 230 detects no input of the VID signal Svid, such that the preset voltage providing unit 220 provides the adjustable preset voltage VOUT (step S803). The embodiment of FIG. 2D may be referred to for an understanding of the voltage in this step. $VOUT_{S1\_ON}$ may be adjusted within the range from 0.5 to 1.5V.

In summary, the VID reference voltage generation circuit and boot voltage generating method of the present invention can immediately provide the adjustable preset determined VOUT at the time, for example, when the computer system just boots up, without affecting the original VID characteristics. Therefore, the present VID reference voltage generation circuit and boot voltage generating method have greater freedom in its application.

Although the invention has been described with reference to the above exemplary embodiments, it will be apparent to one of ordinary skill in the art that modifications to the described exemplary embodiments may be made without departing from the spirit of the invention. Accordingly, the scope of the invention will be defined by the attached claims and not by the above detailed descriptions.

What is claimed is:

1. A voltage identification definition reference voltage generation circuit comprising:
    a preset voltage providing unit;
    a switch coupled to the preset voltage providing unit; and
    a voltage identification definition input signal detection unit coupled to an input terminal of the preset voltage providing unit, the voltage identification definition input signal detection unit generates a control signal to control the switch to turn on, when detecting no input of a voltage identification definition signal, such that a voltage division node of the preset voltage providing unit provides an adjustable preset voltage, wherein when the voltage identification definition input signal detection unit detects an input of the voltage identification definition signal, the switch is turned off.

2. The voltage identification definition reference voltage generation circuit according to claim 1, wherein the preset voltage providing unit comprises a resistor-capacitor network, and the resistor-capacitor network receives a reference voltage.

3. The voltage identification definition reference voltage generation circuit according to claim 2, wherein when the switch is turned on, it changes a voltage of a voltage division node of the resistor-capacitor network, and the voltage division node provides the adjustable preset voltage.

4. The voltage identification definition reference voltage generation circuit according to claim 2, wherein the switch is coupled to a terminal of the resistor-capacitor network.

5. The voltage identification definition reference voltage generation circuit according to claim 2, wherein the switch is coupled to a terminal, an internal node or a voltage division node of the resistor-capacitor network through a resistor, the voltage division node provides the adjustable preset voltage.

6. The voltage identification definition reference voltage generation circuit according to claim 1, wherein the voltage identification definition signal is one of a series voltage identification definition signal type, a parallel voltage identification definition signal type and a pulse modulation voltage identification definition signal type.

7. A boot voltage generating method comprising:
    providing a voltage identification definition reference voltage generation circuit, wherein the voltage identification definition reference voltage generation circuit comprising a preset voltage providing unit, a switch and a voltage identification definition input signal detection unit; and
    generating a control signal to control the switch to turn on, when the voltage identification definition input signal detection unit detects no input of a voltage identification definition signal, such that a voltage division node of the preset voltage providing unit provides an adjustable preset voltage, wherein when the voltage identification definition input signal detection unit detects an input of the voltage identification definition signal, the switch is turned off.

8. The boot voltage generating method according to claim 7, wherein the preset voltage providing unit comprises a resistor-capacitor network, and the resistor-capacitor network receives a reference voltage.

9. The boot voltage generating method according to claim 8, wherein when the switch is turned on, it changes a voltage of a voltage division node of the resistor-capacitor network, and the voltage division node provides the adjustable preset voltage.

10. The boot voltage generating method according to claim 8, wherein the switch is coupled to a terminal of the resistor-capacitor network.

11. The boot voltage generating method according to claim 7, wherein the voltage identification definition signal may be of a series voltage identification definition signal type, a parallel voltage identification definition signal type or a pulse modulation voltage identification definition signal type.

* * * * *